United States Patent [19]
Southgate

[11] Patent Number: 6,161,211
[45] Date of Patent: *Dec. 12, 2000

[54] METHOD AND APPARATUS FOR AUTOMATED CIRCUIT DESIGN

[75] Inventor: Timothy J. Southgate, Redwood City, Calif.

[73] Assignee: Altera Corporation, San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/958,778

[22] Filed: Oct. 27, 1997

Related U.S. Application Data

[60] Provisional application No. 60/029,277, Oct. 28, 1996.

[51] Int. Cl.[7] ................................................. G06F 17/50
[52] U.S. Cl. ........................ 716/1; 716/4; 716/5; 716/6; 716/7; 703/14
[58] Field of Search .................. 395/500.02, 500.03, 395/500.05, 500.06, 500.07, 500.08, 500.12; 713/400

[56] References Cited

U.S. PATENT DOCUMENTS

| | | | |
|---|---|---|---|
| 4,768,087 | 8/1988 | Taub et al. | 358/84 |
| 4,916,738 | 4/1990 | Chandra et al. | 380/25 |
| 5,008,814 | 4/1991 | Mathur | 364/200 |
| 5,050,091 | 9/1991 | Rubin | 364/488 |
| 5,111,413 | 5/1992 | Lazansky et al. | 364/578 |
| 5,155,836 | 10/1992 | Jordan et al. | 395/500 |
| 5,155,837 | 10/1992 | Liu et al. | 395/500 |
| 5,206,939 | 4/1993 | Yanai et al. | 395/400 |
| 5,220,512 | 6/1993 | Watkins et al. | 395/500.12 |
| 5,278,769 | 1/1994 | Bair et al. | 364/490 |
| 5,301,318 | 4/1994 | Mittal | 395/600 |
| 5,335,320 | 8/1994 | Iwata et al. | 395/155 |
| 5,367,468 | 11/1994 | Fukasawa et al. | 395/500.12 |
| 5,418,728 | 5/1995 | Yada | 364/468 |
| 5,422,833 | 6/1995 | Kelem et al. | 364/578 |

(List continued on next page.)

FOREIGN PATENT DOCUMENTS

| | | | |
|---|---|---|---|
| 0703531A1 | 3/1996 | European Pat. Off. | G06F 9/44 |
| 92/09160 A1 | 5/1992 | WIPO | H04L 9/00 |
| 96/32679 | 10/1996 | WIPO | G06F 13/00 |
| 97/48044 | 12/1997 | WIPO | G06F 9/445 |

OTHER PUBLICATIONS

Heinkel, U.; Glauert, W. H.; An Approach for a Dynamic Generation/Validation System for the Functional Simulation Considering Timing Constraints, Proceedings of the European Desing and Test Conference 1996, pp1 302–306, Mar. 1996.

Ganguly et al., "HSIM1 and HSIM2:Object Oriented Algorithms for VHDL Simulation", Proceedings of theSeventh International Conference on VLSI Design, 1994, pp. 175–178.

(List continued on next page.)

*Primary Examiner*—Kevin J. Teska
*Assistant Examiner*—Douglas D. Sergent
*Attorney, Agent, or Firm*—Beyer Weaver & Thomas, LLP

[57] ABSTRACT

A method for designing a circuit is described. A block diagram corresponding to the circuit is generated according to an external specification associated with the circuit. Each block in the block diagram has a block specification associated therewith. A design file is generated for each block in the block diagram using the associated block specification and one of a plurality of design file templates. Each block in the block diagram is implemented by editing its corresponding design file. The operation of each block in the block diagram is simulated. A overall design for the circuit is compiled. After the design is compiled, changes are incorporated into the compiled design in response to changes in at least one design file through the use of software links maintained between the compiled design and the design files. A device is then configured according to the compiled design. Generation of the block diagram and the design file for each block, implementation and simulation of each block, compilation of the compiled design, incorporation of changes into the compiled design, and configuration of the device are all done under software control.

46 Claims, 5 Drawing Sheets

U.S. PATENT DOCUMENTS

| | | | |
|---|---|---|---|
| 5,423,023 | 6/1995 | Batch et al. | 395/500 |
| 5,436,849 | 7/1995 | Drumm | 364/490 |
| 5,442,790 | 8/1995 | Nosenchuck | 395/700 |
| 5,463,563 | 10/1995 | Bair et al. | 364/490 |
| 5,499,192 | 3/1996 | Knapp et al. | 364/489 |
| 5,513,124 | 4/1996 | Trimberger et al. | 364/491 |
| 5,524,253 | 6/1996 | Pham et al. | 395/800 |
| 5,526,517 | 6/1996 | Jones et al. | 395/600 |
| 5,541,849 | 7/1996 | Rostoker et al. | 364/489 |
| 5,572,436 | 11/1996 | Dangelo et al. | 395/500.02 |
| 5,572,437 | 11/1996 | Rostoker et al. | 364/489 |
| 5,574,655 | 11/1996 | Knapp et al. | 364/489 |
| 5,594,657 | 1/1997 | Cantone et al. | 364/490 |
| 5,623,418 | 4/1997 | Rosotker et al. | 395/500.02 |
| 5,625,565 | 4/1997 | Van Dyke | 364/489 |
| 5,661,660 | 8/1997 | Freidin | 364/489 |
| 5,673,198 | 9/1997 | Lawman et al. | 395/500.12 |
| 5,691,912 | 11/1997 | Duncan | 364/490 |
| 5,696,454 | 12/1997 | Trimberger | 326/38 |
| 5,715,387 | 2/1998 | Barnstijn et al. | 395/183.14 |
| 5,721,912 | 2/1998 | Stepczyk et al. | 395/613 |
| 5,737,234 | 4/1998 | Seidel et al. | 364/488 |
| 5,745,748 | 4/1998 | Ahmad et al. | 395/610 |
| 5,761,079 | 6/1998 | Drumm | 364/489 |
| 5,790,416 | 8/1998 | Norton et al. | 364/490 |
| 5,801,958 | 9/1998 | Dangelo et al. | 364/489 |
| 5,805,861 | 9/1998 | Gilbert et al. | 395/500 |
| 5,809,145 | 9/1998 | Slik et al. | 380/25 |
| 5,812,847 | 9/1998 | Joshi et al. | 395/682 |
| 5,819,072 | 10/1998 | Bushard et al. | 395/500 |
| 5,848,263 | 12/1998 | Oshikiri | 395/500.04 |
| 5,850,348 | 12/1998 | Berman | 364/488 |
| 5,867,691 | 2/1999 | Shiraishi | 713/400 |
| 5,870,308 | 2/1999 | Dangelo et al. | 364/489 |
| 5,878,225 | 3/1999 | Bilansky et al. | 395/200.57 |
| 5,896,521 | 4/1999 | Shackleford et al. | 395/500 |
| 5,901,066 | 5/1999 | Hong | 364/491 |
| 5,903,475 | 5/1999 | Gupte et al. | 364/578 |
| 5,909,545 | 6/1999 | Frese, II et al. | 395/200.38 |
| 5,983,277 | 11/1999 | Heile et al. | 709/232 |

OTHER PUBLICATIONS

Maurer, P.M., "Efficient Simulation for Hierarchical and Partioned Circuits", Proceedings of the Twelfth International Conference on VLSI Design, 1999, pp. 236–241.

Riley et al., "An Instance of the Application Download Pattern. The SPAIDS Software Loader/Verifier Domain Analysis and Implementation," ACM 1997, pp. 273–278.

Spang, III et al., "The BEACON block–diagram environment," World Congress of the International Federation of Automatic Control, vol. 2, Robust Control, Design and Software, Jul. 18, 1993, pp. 749–754.

Rimvall et al., "An Open Architecture for Automatic Code Generation Using the BEACON CACE Environment," Proceedings of IEEE/IFAC Joint Symposium on Computer–Aided Control System Design, Mar. 7, 1994, pp. 315–320.

Girardi et al., "A Register Transfer Level Schematic Editor and Simulator Interface," CSELT Technical Reports, vol. 13, No. 6, Nov. 1985, pp. 403–409.

Heinkel and Glauert, "An Approach for a Dynamic Generation/Validation System for the Functional Simulation Considering Timing Constraints," Proceedings of IEEE/Institute for Computer–Aided Circuit Design, Mar. 11, 1996, pp. 302–306.

Summit Design Inc., "Visual HDL for Verilog Short Course," Sep. 19, 1996, pp. 1–167, *IEEE*.

Bershad, et al., "Lightweight Remote Procedure Call," *ACM Transactions on Computer Systems*, 8:1, pp. 37–55 (1990).

Gavish, et al., "Dynamic File Migration in Distributed Computer Systems," *Communications of the ACM*, 33:2, pp. 177–189 (1990).

Iftode, et al., "Shared Virtual Memory with Automatic Update Support," *ICS ACM*, pp. 175–183 (1999).

Keleher, "Tapeworm: High–Level Abstractions of Shared Accesses," *USENIX Association OSDI*, pp. 210–214 (1999).

METHOD AND APPARATUS FOR AUTOMATED CIRCUIT DESIGN

RELATED APPLICATION DATA

The present application claims priority from U.S. Provisional Application Ser. No. 60/029,277 entitled TOOLS FOR DESIGNING PROGRAMMABLE LOGIC DEVICES filed on Oct. 28, 1996, the entire specification of which is incorporated herein by reference.

This invention is related to U.S. patent application Ser. No. 08/958,002 filed on the same day as this patent application, naming B. Pedersen et al. as inventors, and entitled "GENERATION OF SUBNET LISTS FOR USE IN INCREMENTAL COMPILATION." That application is incorporated herein by reference in its entirety and for all purposes.

This invention is also related to U.S. patent application Ser. No. 08/958,436, filed on the same day as this patent application, naming J. Tse et al. as inventors, and entitled "FITTING FOR INCREMENTAL COMPILATION OF ELECTRONIC DESIGNS." That application is incorporated herein by reference in its entirety and for all purposes.

This invention is also related to U.S. patent application Ser. No. 08/958,670, filed on the same day as this patent application, naming D. Mendel as inventor, and entitled "PARALLEL PROCESSING FOR COMPUTER ASSISTED DESIGN OF ELECTRONIC DEVICES." That application is incorporated herein by reference in its entirety and for all purposes.

This invention is also related U.S. patent application Ser. No. 08/958,626, filed on the same day as this patent application, naming F. Heile et al. as inventors, and entitled "INTERFACE FOR COMPILING DESIGN VARIATIONS IN ELECTRONIC DESIGN ENVIRONMENTS." That application is incorporated herein by reference in its entirety and for all purposes.

This invention is also related to U.S. patent application Ser. No. 08/958,778, filed on the same day as this patent application, naming T. Southgate as inventor, and entitled "METHOD AND APPARATUS FOR AUTOMATED CIRCUIT DESIGN." That application is incorporated herein by reference in its entirety and for all purposes.

This invention is also related to U.S. patent application Ser. No. 08/958,434, filed on the same day as this patent application, naming T. Southgate et al. as inventors, and entitled "GRAPHIC EDITOR FOR BLOCK DIAGRAM LEVEL DESIGN OF CIRCUITS." That application is incorporated herein by reference in its entirety and for all purposes.

This invention is also related to U.S. patent application Ser. No. 08/958,432, filed on the same day as this patent application, naming T. Southgate et al. as inventors, and entitled "DESIGN FILE TEMPLATES FOR IMPLEMENTATION OF LOGIC DESIGNS." That application is incorporated herein by reference in its entirety and for all purposes.

This invention is also related to U.S. patent application Ser. No. 08/958,414, filed on the same day as this patent application, naming T. Southgate as inventor, and entitled "METHOD FOR PROVIDING REMOTE SOFTWARE TECHNICAL SUPPORT." That application is incorporated herein by reference in its entirety and for all purposes.

This invention is also related to U.S. patent application Ser. No. 08/958,777, filed on the same day as this patent application, naming T. Southgate as inventor, and entitled "METHOD FOR SIMULATING A CIRCUIT DESIGN" That application is incorporated herein by reference in its entirety and for all purposes.

This invention is also related to U.S. patent application Ser. No. 08/957,957 now U.S. Pat. No. 5,983,277, filed on the same day as this patent application, naming F. Heile et al. as inventors, and entitled "WORKGROUP COMPUTING FOR ELECTRONIC DESIGN AUTOMATION." That application is incorporated herein by reference in its entirety and for all purposes.

This invention is also related to U.S. patent application Ser. No. 08/958,798, filed on the same day as this patent application, naming F. Heile as inventor, and entitled "LOCAL COMPILATION IN CONTEXT WITHIN A DESIGN HIERARCHY." That application is incorporated herein by reference in its entirety and for all purposes.

This invention is also related to U.S. patent application Ser. No. 08/958,435, filed on the same day as this patent application, naming Alan L. Herrmann et al. as inventors, and entitled "EMBEDDED LOGIC ANALYZER FOR A PROGRAMMABLE LOGIC DEVICE." That application is incorporated herein by reference in its entirety and for all purposes.

This invention is also related to U.S. patent application Ser. No. 08/958,431, filed on the same day as this patent application, naming F. Heile as inventor, and entitled "ELECTRONIC DESIGN AUTOMATION TOOL FOR DISPLAY OF DESIGN PROFILE." That application is incorporated herein by reference in its entirety.

BACKGROUND OF THE INVENTION

The present invention relates to software tools for facilitating automated circuit design. More specifically, the present invention relates to an integrated design methodology which employs different combinations of software design tools to effect a complete circuit design from a top level block diagram to the bottom level circuit implementation.

There are a number of commercially available software design tools for designing programmable logic devices. The level of expertise required to use these tools and the complexity of the tools themselves vary rather dramatically. Some tools employ a syntax-heavy approach which requires sophisticated programming skills and intimate knowledge of a text editor. Others employ a more userfriendly visual approach which relies on the manipulation of visual objects using a graphic editor. In the past, the common denominator for such design tools has been that each is typically employed to specify the circuit level implementation of the logic device. The higher levels of the design process were left to the discretion and idiosyncrasies of the individual designer who would, in many cases, implement and document the high level design using paper and pencil. Not only can this result in inconsistent documentation of the design, it makes it difficult for design information to be shared among collaborating designers.

There are computer aided drawing (CAD) tools with which a designer can create high level design representations such as block diagrams in a graphical user interface. However, such CAD tools do not interface with the design tools used for defining the circuit level implementation of the blocks in the block diagram. Even with an electronically created block diagram, unrelated design files must be created with separate design tools for the implementation of the individual blocks of the diagram. That is, a block diagram created with a currently available CAD tool is about as useful as a hand drawn block diagram with regard to the circuit level implementation of a design.

Virtually no automated tools have been available with which a designer can begin implementation of his design at some level higher than the circuit level. Thus, even though some exemplary automated design tools exist, there is still considerable inefficiency in the way in which higher level designs are implemented.

It is therefore desirable to provide a design methodology and associated design tools with which a designer may implement his design from the top down, beginning with the system requirements all the way down to the circuit level implementation. It is also desirable that such a design methodology be able to integrate currently available circuit design tools.

SUMMARY OF THE INVENTION

According to the present invention a design methodology is provided by which the design of a circuit may be implemented from the top down, i.e., from the system requirements to the circuit level implementation. The design methodology of the present invention provides an approach to the design process in which design elements from different design levels are integrated into a design hierarchy using a combination of new and currently available automated design tools. The present invention provides a number of advantages with respect to previous ad hoc approaches. For example, it allows the designer to make changes in any level of the design hierarchy which are automatically incorporated into other levels. It also provides some uniformity of design methodology and data formats so that design collaborators may easily share information. Ultimately, the present invention significantly reduces the time between an idea and an operating circuit.

According to a specific embodiment, the designer employs a graphic editor to create a block diagram of the top level of his design as dictated by the relevant system requirements. For each of the blocks in the top level design, design file templates in any of a variety of formats are created in which the individual blocks are then implemented. For example, the design file format for one block may be Verilog in which case a Verilog design file skeleton or template is created. The designer then specifies the block using a text editor and the appropriate Verilog syntax to flesh out the template. Alternatively, another block may require further block diagram implementation in which case, another graphic design file may be created in which the designer specifies the block with a more detailed block diagram and/or visual representation of logic gates. As mentioned above, modifications to a design file at any level of the design hierarchy are automatically incorporated into affected design files on other hierarchy levels. It should also be noted that previously existing design files (e.g., a frequently used microcontroller design file) may be incorporated into a new design.

Once a block is specified down to its circuit level implementation, its operation may be simulated using a variety of well known simulation techniques. The appropriate simulation technique depends, of course, on the design file format of the block's circuit level implementation. For example, a VHDL design file would be simulated using test vectors and a VHDL test bench. Once the designs for individual blocks are verified through simulation, the present invention provides a means by which the designer can easily combine these blocks for simulation of all or part of the overall design. When the entire design is verified through simulation, it is then compiled. At this point the circuit timing is checked to determine whether the performance goals for the design as specified by the system requirements have been met. If not, the designer may make any necessary modifications to the design at any level of the design hierarchy using a combination of text and graphic editors. The modified blocks are then simulated and combined until the compiled design satisfies the system performance goals. The device is then programmed/configured and tested in the system.

Thus, the present invention provides a method for designing a circuit. A block diagram corresponding to the circuit is generated according to an external specification associated with the circuit. Each block in the block diagram has a block specification associated therewith. A design file is generated for each block in the block diagram using the associated block specification and one of a plurality of design file templates. Each block in the block diagram is implemented by editing its corresponding design file. The operation of each block in the block diagram is simulated. An overall design for the circuit is compiled. After the design is compiled, changes are incorporated into the compiled design in response to changes in at least one design file through the use of software links maintained between the compiled design and the design files. Generation of the block diagram and the design file for each block, implementation and simulation of each block, compilation of the overall design, and incorporation of changes into the compiled design are all done under software control.

A further understanding of the nature and advantages of the present invention may be realized by reference to the remaining portions of the specification and the drawings.

DESCRIPTION OF SPECIFIC EMBODIMENTS

Figure 1:
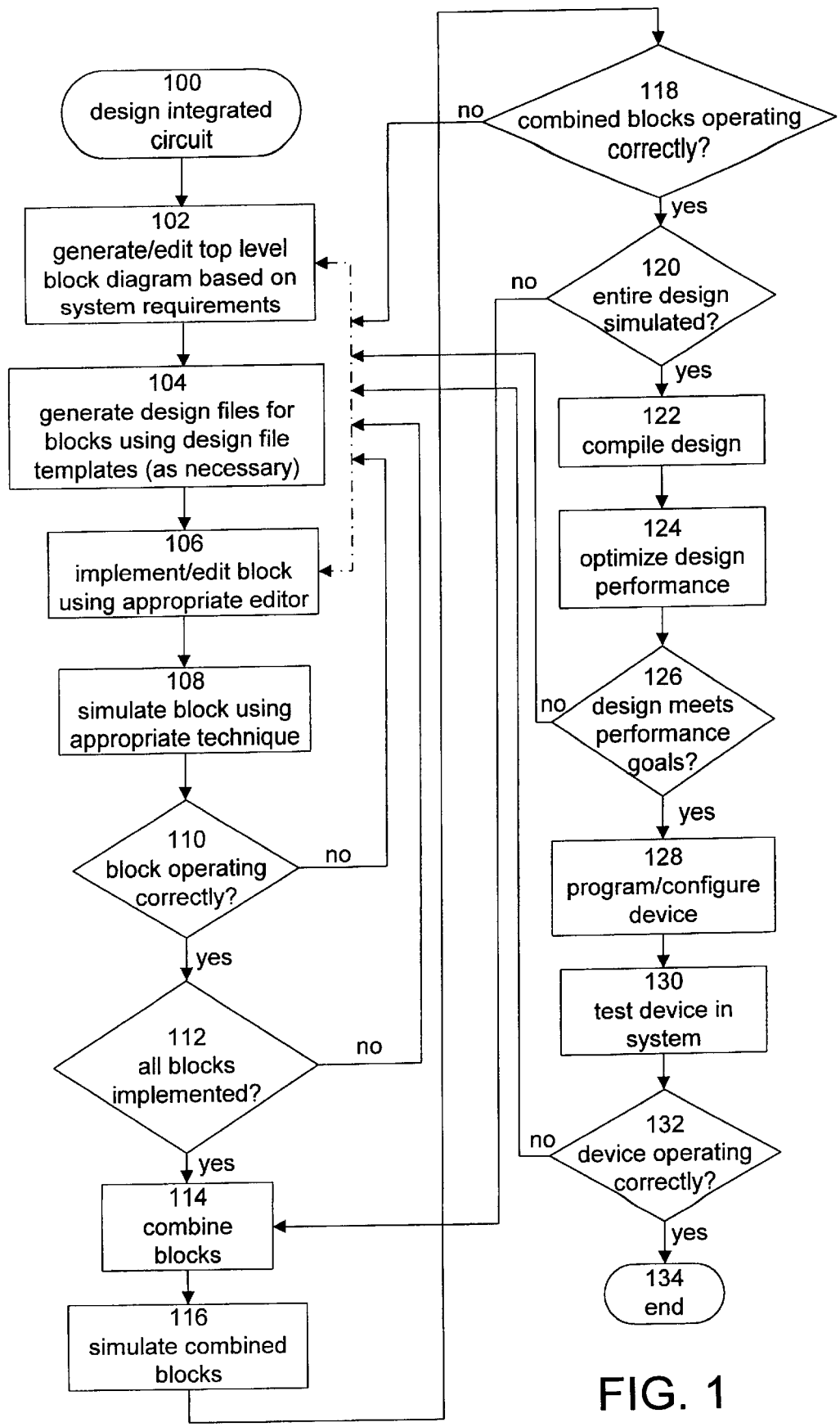
FIG. 1 is a flowchart illustrating a specific embodiment of the circuit design methodology of the present invention.

A specific embodiment of the design methodology of the present invention will now be described with reference to flowchart 100 of FIG. 1. While the present invention is being described with reference to this example, it will be understood that a wide variety of design methodologies employing the techniques described herein are within the scope of the invention. Typically, the designer is given an external specification for the device to be designed. The external specification describes the device pin names and functionalities with reference to system requirements which dictate the overall device functionality along with timing constraints and available system resources. In the past, the designer would begin the design process by drawing a high level block diagram of the device in a notebook based on the external specification. The hand drawn block diagram was used as a tool for organizing the thoughts of the designer as to the high-level architecture and functionalities of the device, but was not used as a software design entry point. In fact, several levels of such hand drawn block diagrams of increasing detail were often employed until the level of detail reached a point where available software design tools could provide design elements having the requisite functionalities.

Figure 2:
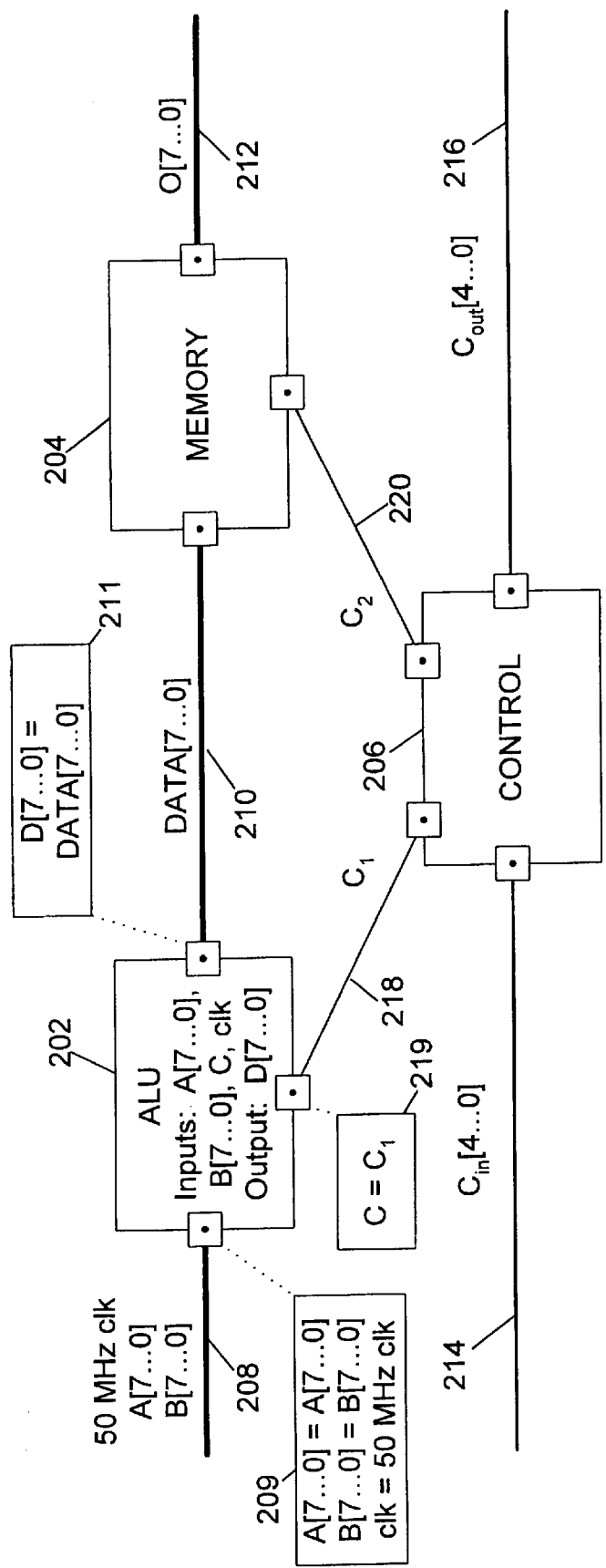
FIG. 2 shows an example of a high level block diagram of a circuit design created according to a specific embodiment of the invention.

By contrast, the present invention provides a fully integrated design methodology according to which the designer may employ even the highest level block diagram as a software design entry point. Referring to FIG. 1, the designer uses a graphic editor to generate a top level block diagram based on the system requirements (step 102). An example of a graphic editor for use with the present invention is described in commonly assigned, copending U.S. patent application Ser. No. 08/958,434, for GRAPHIC EDITOR FOR BLOCK DIAGRAM LEVEL DESIGN OF CIRCUITS, filed simultaneously herewith, the entire specification of which is incorporated herein by reference. FIG. 2 shows an example of a high level block diagram of a circuit design created using a graphic editor according to a specific embodiment of the invention. Using standard elements in the graphic editor or his own customized elements, the designer lays out on the screen of his workstation a high level design of his circuit according to the device external specification and the timing requirements. The design shown includes an arithmetic logic unit (ALU) 202, a memory 204, and some kind of control circuitry 206. The designer then interconnects blocks 202, 204 and 206 and specifies external connections to device 200 via a plurality of conduits, each of which represents one or more signals in either direction as required to implement the functionalities desired by the designer. For example, conduit 208 represents input signals A[7 . . . 0] and B[7 . . . 0] and a 50 MHz clock signal. Conduit 210, with the specification DATA[7 . . . 0], represents the data lines between ALU 202 and memory 204. Conduit 212, with the specification O[7 . . . 0], represents the output signal or signals of device 200. Conduits 214 and 216 respectively represent the control inputs and outputs to device 200 as specified by $C_{in}$[4 . . . 0] and $C_{out}$[4 . . . 0]. Finally, conduits 218 and 220 respectively represent control signals $C_1$ and $C_2$ for ALU 202 and memory 204.

The designer then specifies the I/O for each of the blocks. For example, because it is an ALU, block 202 will receive two inputs and, given some control input, provide an output. Thus, the designer might specify inputs A[7 . . . 0] and B[7 . . . 0], control input C, and data output D[7 . . . 0]. A clock input clk would also typically be specified. I/O for memory block 204 and control circuitry 206 (not shown) are similarly specified. The I/O for each block is then mapped to the signal names in the associated conduits. This enables the designer to specify a particular block very generally so that it may be used elsewhere in the design or in other designs. Thus inputs A[7 . . . 0] and B[7 . . . 0] are mapped to identically named signals A[7 . . . 0] and B[7 . . . 0] in conduit 208 while the input clk is mapped to 50 MHz clock in the same conduit (see box 209). Output D[7 . . . 0] is mapped to DATA[7 . . . 0] in conduit 210 (box 211) while input C is mapped to $C_1$ in conduit 218 (box 219). The I/O for blocks 204 and 206 are similarly mapped to the associated conduits (not shown). The fully specified block diagram, i.e., the drawing information, is stored in a graphic design file.

Once the designer has a fully specified high level block diagram he may create more detailed block diagrams or circuit level implementations of each of the blocks in the high level diagram as required by executing a command which instantiates the I/O of a selected block in a new lower level block diagram or in any of several design file formats. That is, according to the invention, a variety of design file templates are provided in which the block specification of a selected block are instantiated to generate an incomplete design file in any of several commonly used graphic and textbased formats (step 104). For the text formats supported by the present invention, the design file templates may include much of the complicated syntax which the designer would otherwise need to write. The designer then completes the design file, i.e., implements the block, using the appropriate graphic or text editor (step 106). The implementation may be, for example, another block diagram or the circuit level implementation of the block. The use of the design file templates proves to be much less labor intensive than the designer using a text editor and creating design files for each block from scratch. This is especially valuable for the more complex, syntax-heavy design file formats such as VHDL and Verilog. In addition, the designer may customize the design file template to incorporate personal preferences such as formatting and documentation. A more complete discussion of the use of design file templates is provided in commonly assigned, copending U.S. patent application Ser. No. 08/958,432 entitled DESIGN FILE TEMPLATES FOR IMPLEMENTATION OF LOGIC DESIGNS filed simultaneously herewith, the entire specification of which is incorporated herein by reference.

Once a block is specified down to its circuit level implementation, its operation is simulated using a behavioral simulation technique appropriate to the format in which the block was implemented (step 108). For example, a block implemented in VHDL or Verilog is simulated using test vectors of the appropriate format and an appropriate test bench. If the block is not operating correctly (step 110), edits may be made to the block and/or the top level block diagram as indicated by the dashed line. Where the edits made to the top level diagram include additional blocks, new design files are generated for these blocks as necessary (step 104). When the block simulation indicates correct operation and all of the blocks in the top level diagram have been implemented (step 112), the blocks may be combined (step 114) and simulated (step 116) in a variety of ways. When simulation of a combination of blocks has negative results (step 118), edits of any of the selected blocks and/or the block diagram may again be appropriate. This procedure is carried out until the entire design has been simulated. Examples of techniques by which blocks may be combined for simulation are described in commonly assigned, copending U.S. patent application Ser. No. 08/958,777, for METHOD FOR SIMULATING A CIRCUIT DESIGN, filed simultaneously herewith, the entire specification of which is incorporated herein by reference.

Where the combined simulation has positive results and the entire design has been successfully simulated (step 120), the design is compiled through to generate an implementation in one of a variety of technologies (step 122). This step generates timing information for the implementation. The timing analysis inside the compiler is used to determine if the performance goals for the design have been met and the design is optimized accordingly (step 124). If the design is not operating according to the system requirements (step 126) it may be necessary to effect a redesign by editing one or more blocks and/or the block diagram itself. If, however, the design meets performance goals, the device may then be configured (step 128), e.g., the programmable logic device programmed, and the device tested in the system (step 130). Where the device does not meet performance goals (step 132) it may again be necessary to effect a redesign by editing one or more blocks and/or the block diagram. Because of the way in which the different levels of the design are integrated according to the present invention, edits and changes made on one level may be automatically incorporated into all other levels affected by the change. Where the device operates satisfactorily in the system, the design process is complete.

The graphic editor described in the above-referenced application may be employed to facilitate simulation of individual blocks in a block diagram (step 108), a combination of blocks (step 116), or the entire design. Simulation of different portions of a design has been problematic in the past because it has typically been necessary to make a copy of the entire design file and remove the portions not to be included in the simulation. The difficulty of doing this using VHDL or Verilog is well understood by those of skill in the art. By contrast, the graphic editor described in the above-referenced application may be used to select a region including one or more blocks of a block diagram in the GUI, e.g., by enclosing or excluding the desired block(s) using an expandable, mouse-controlled selection region, and to execute a simulation for only the selected region or block(s). The appropriate test protocol and test vectors would, of course, still need to generated according to any of a variety of well known techniques, but the work in isolating the portions of the design to be simulated is greatly reduced.

The graphic editor described in the above-referenced application also includes a feature whereby the optimization information of the simulated blocks and/or regions are automatically provided in the block diagram as visual text annotations in the appropriate locations. That is, once a simulation has been performed, the performance data for each block in the simulation are presented on the screen in a format which may be customized by the designer. This facilitates a more intuitive and less cumbersome technique for evaluation of a design in contrast to the less convenient situation in which such performance information is provided in a separate file. According to another embodiment, the simulation results are also displayed as a series of waveforms, e.g., timing diagrams.

Figure 3:
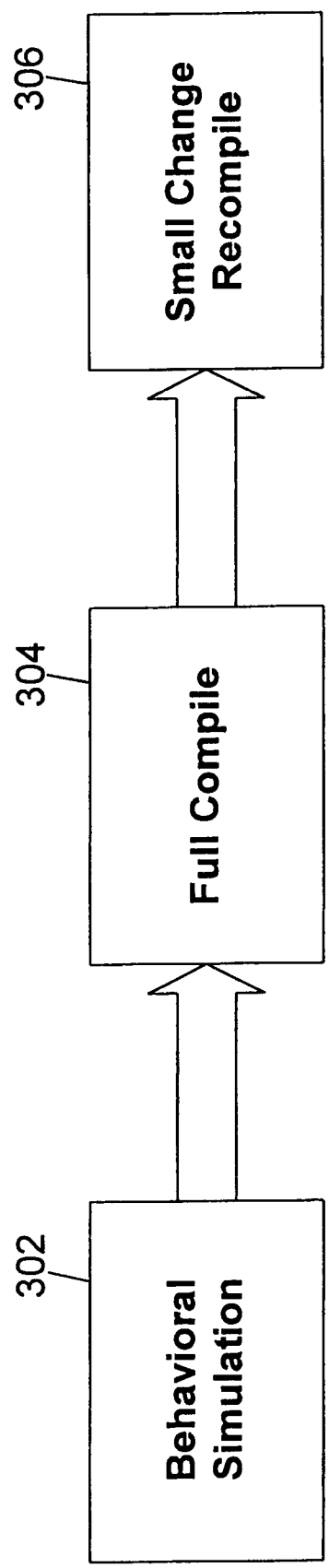
FIG. 3 is a high level flow diagram of a specific embodiment of the circuit design methodology of the present invention.

FIG. 3 is a high level flow diagram of a specific embodiment of the circuit design methodology of the present invention. Three phases of the design flow are identified. In Behavioral Simulation phase 302, the designer spends a significant amount of time specifying the circuit design and debugging its functionality using a front end behavioral simulator. In such a simulation, the operation of the design is simulated typically without regard to delays. According to specific embodiments, there are exceptions to this such as where the circuit level implementation of the design is written in VHDL or Verilog and the code contains timing information. In such cases, the designer may specify whether the simulation is to use or ignore the timing information. Because a large number of design changes are anticipated during the initial design phase, the cycle time between a single design change and the start of a simulation is very short, e.g., less than 30 seconds.

Once the circuit design is functionally complete a full compile is effected in Full Compile phase 304. A full compile takes the design description generated in phase 302 and optimizes it by logic minimization, removal of redundant logic, and restructuring of the design to achieve better density. The optimized design is then mapped into a particular programmable logic device. Timing analysis and simulation may then be performed on the fully compiled design. As is well understood, a full compile takes a very long time, e.g., several hours or even days. Therefore, the number of iterations is intentionally kept low. As the size of programmable devices and compile times increase, the importance of keeping this number low will also increase.

During Small Change Recompile phase 306, the designer debugs the fully compiled design in the system and/or optimizes the design for utilization and performance. Phase 306 helps keep the number of full compile iterations low by allowing the designer to make small changes to the design source files which are then incorporated into the compiled design relatively quickly. Of course, the speed with which changes can be incorporated into the compiled design depends upon the scope of the changes. Therefore, the type of changes envisioned for this phase are typically for correction of minor logic and timing errors.

In order to effect these recompiles, the present invention maintains links between the design source files, i.e., text and graphic design files, and the compiled design. These links are used to determine what changes to the compiled design are necessary when the designer makes a change to any of the design source files associated with the design. That is, the present invention maps the names and I/O of design entities in the design source files to the actual circuitry in the compiled design so that circuitry affected by a design change may be easily identified.

Figure 4:
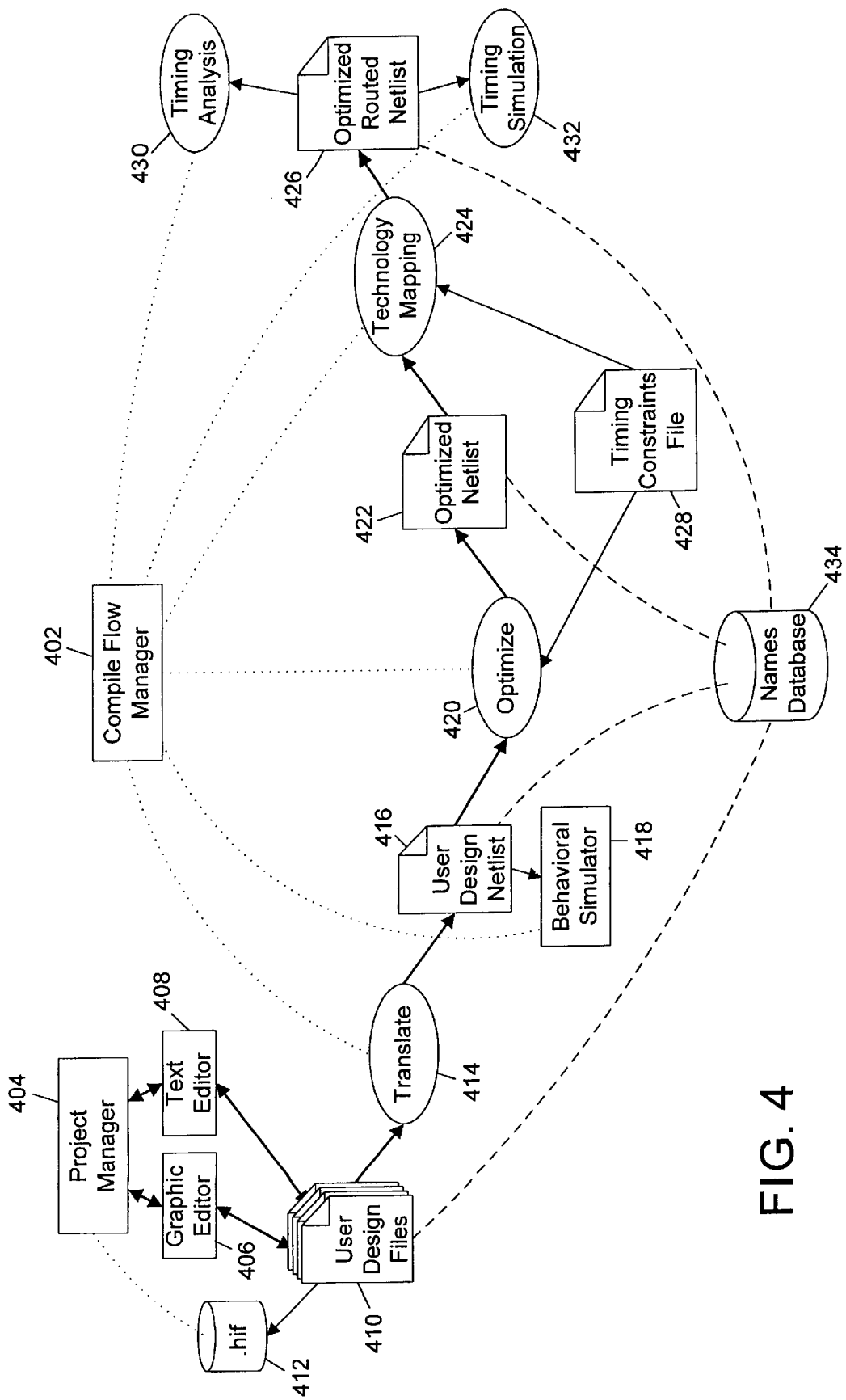
FIG. 4 is a more detailed flow diagram of a portion of a specific embodiment of the design methodology of the present invention.

FIG. 4 is a more detailed flow diagram of a portion of a specific embodiment of the design methodology of the present invention. This diagram corresponds roughly to design phases 302 and 304 of FIG. 3. A compile flow manager 402 controls all of the processes (designated by ovals) in the flow. A project manager 404 interacts with and facilitates the operation of a graphic editor 406 and a text editor 408 which are used by the designer to create design source files 410 which may be in any of a variety of graphic and text formats. Project manager 404 also interacts with hierarchy information database 412 which stores the hierarchy information files for each IC design. Hierarchy files relate all of the design files associated with a particular design and are used to determine when an update of a design file is necessitated by a change in a related design file.

Once a designer generates one or more design files corresponding to all or part of a circuit design, the files 410 are translated (process 414) from multiple formats into a single format user design netlist 416. A front end behavioral simulator 418 acts on user design netlist 416 to yield behavioral information regarding the portion of the design represented by netlist 416. According to a specific embodiment, and as mentioned above, this information may appear as annotations on one or more of design files 410 for convenient reviewing by the designer. This is true for either graphic or text design files. Based on the simulation results, the designer may then make changes to one or more of design files 410 and resimulate the design as appropriate until the design operates as intended. The translation of design files 410 to user design netlist 416 is accomplished relatively quickly. Therefore, as is desirable, the time between simulation iterations is very short.

When the circuit design or a large portion of it is functionally complete, full compile phase 304 (see FIG. 3) begins. In this design phase, user design netlist 416 is optimized (process 420) thereby generating an optimized netlist 422. As discussed above with reference to FIG. 3, the optimization process involves logic minimization, elimination of redundant logic, and restructuring of the design to achieve better density. The resulting netlist is structurally completely different than user design netlist 416. Optimized netlist 422 is then mapped (process 424) to a particular technology and device type to generate an optimized routed netlist 426. According to a specific embodiment, the decisions made by optimization process 420 and mapping process 424 are constrained by information in a timing constraints file 428. The specification of timing constraints is not necessary for all embodiments of the invention. However, when these constraints are available, the optimization and mapping processes are able to make better decisions thereby improving the performance and efficiency of optimized routed netlist 426.

Once an optimized routed netlist 426 is available, it may be determined whether the design meets the system timing constraints using timing analysis (process 430) and/or timing simulation (process 432). Timing analysis 430 is significantly less involved than timing simulation 432, only involving determination of the delay associated with the critical path through the design. That is, the user specifies one or more paths through the design and determines the worst case delay. Timing simulation 432, on the other hand, is much more complicated involving the application of simulation vectors to optimized routed netlist 426. Because this consumes considerably more time than the more simple timing analysis 430, timing simulation 432 is used sparingly such as in the case where timing analysis 430 reveals that the design does not meet the system timing constraints. In such a situation, a timing simulation is performed to determine why and where the design failed. A timing simulation may also be done to determine why an earlier behavioral simulation was not completely correct. As with behavioral simulations, the source design files 410 are annotated with the timing information generated by timing analysis 430 and timing simulation 432 to facilitate troubleshooting of the design.

The optimization and mapping of the design are part of an iterative compilation process. If, for example, a timing analysis and/or simulation reveals that the system timing constraints are not met by the design in its current configuration, compile flow manager 402 automatically sends the design back to either optimization process 420 or mapping process 424. If after some number of attempts the performance goals of the design are not met, compile flow manager 402 decides to exit the compile. According to different embodiments, this decision may be based, for example, on the elapsed compile time or the number of compile iterations executed. At this point, the design may be sent back to design phase 302 for substantial structural rewriting, or forward to design phase 306 for relatively minor changes.

As discussed above, in design phase 306, the designer may review the design source files as annotated with the timing information to determine whether only minor changes are necessary to make the design meet the system performance goals. According to some embodiments, the timing information is accompanied by area information for specific design entities. These annotations appear in both graphic and text design files. In a graphic design file, the annotations appear adjacent the visual representation of the associated design entity. In a text design file, the annotations appear adjacent the code describing the associated design entity. For example, an annotation may indicate the delay associated with particular line of code. This information helps the designer make intelligent decisions regarding potential changes to the design. As mentioned above, any changes made in this design phase (or any design phase for that matter) are automatically incorporated into related source design files 410 and the various netlists associated with the design (416, 422, and 426). This is facilitated by names database 434 which maintains links between the names and I/O of design entities in the source design files and the corresponding entities in the various netlists. Thus, any circuitry affected by a design change may be easily identified and the appropriate modification effected.

Figure 5:
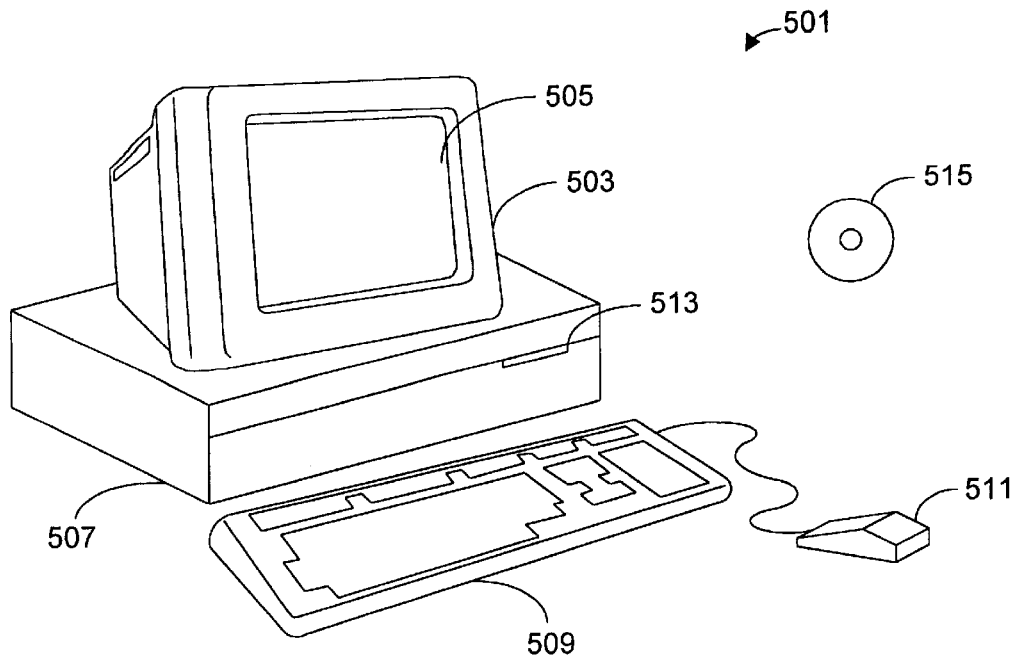
FIG. 5 is an example of a computer system that may be utilized to execute the software of an embodiment of the invention.

FIG. 5 illustrates an example of a computer system that may be used to execute the software of an embodiment of the invention. FIG. 5 shows a computer system 501 which includes a display 503, screen 505, cabinet 507, keyboard 509, and mouse 511. Mouse 511 may have one or more buttons for interacting with a graphical user interface. Cabinet 507 houses a CD-ROM drive 513, system memory and a hard drive (see FIG. 6) which may be utilized to store and retrieve software programs incorporating computer code that implements the invention, data for use with the invention, and the like. Although the CD-ROM 515 is shown as an exemplary computer readable storage medium, other computer readable storage media including floppy disks, tape, flash memory, system memory, and hard drives may be utilized.

Figure 6:
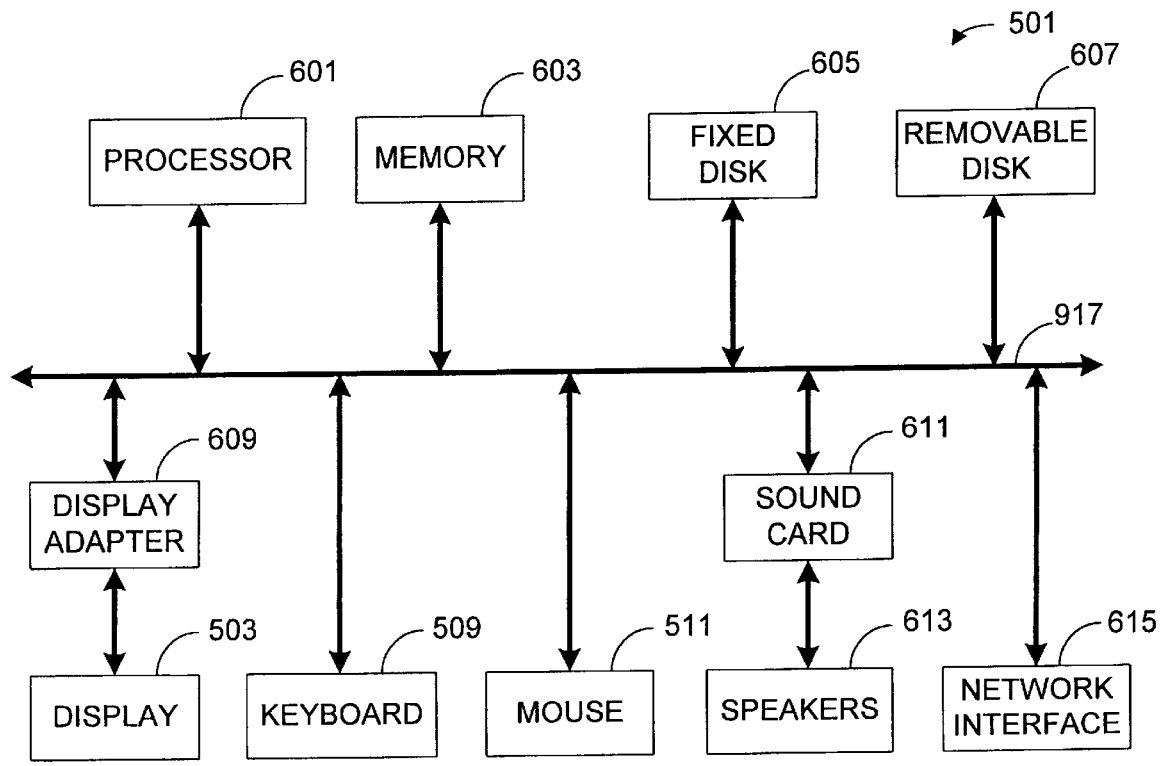
FIG. 6 shows a system block diagram of the computer system of FIG. 5.

FIG. 6 shows a system block diagram of computer system 501 used to execute the software of an embodiment of the invention. As in FIG. 5, computer system 501 includes monitor 503 and keyboard 509, and mouse 511. Computer system 501 further includes subsystems such as a central processor 601, system memory 603, fixed disk 605 (e.g., hard drive), removable disk 607 (e.g., CD-ROM drive), display adapter 609, sound card 611, speakers 613, and network interface 615. Other computer systems suitable for use with the invention may include additional or fewer subsystems. For example, another computer system could include more than one processor 601 (i.e., a multi-processor system), or a cache memory.

The system bus architecture of computer system 501 is represented by arrows 617. However, these arrows are illustrative of any interconnection scheme serving to link the subsystems. For example, a local bus could be utilized to connect the central processor to the system memory and display adapter. Computer system 501 shown in FIG. 6 is but an example of a computer system suitable for use with the invention. Other computer architectures having different configurations of subsystems may also be utilized.

While the invention has been particularly shown and described with reference to specific embodiments thereof, it will be understood by those skilled in the art that changes in the form and details of the disclosed embodiments may be made without departing from the spirit or scope of the invention. For example, the present invention provides a high degree of flexibility to suit individual design styles. So, if a particular designer wants to start from a library of design files, he could, for example, instantiate fully specified blocks corresponding to selected design files in the library into a higher level block diagram. That is, the designer could work from the lower level design file toward the higher level block diagram rather than the other direction as described above. In addition, many different combinations of graphic and text design files may be used to specify a design, the text files being in any of a variety of formats, e.g., VHDL or Verilog. Moreover, the present invention is not restricted to the design of a specific type of circuitry. Rather the present invention may be employed, for example, in the design of programmable logic devices, gate arrays, discrete circuitry, and a wide variety of integrated circuits. Therefore, the scope of the invention should be determined with reference to the appended claims.

What is claimed is:

1. A method for designing a circuit comprising:

generating a block diagram corresponding to the circuit according to an external specification associated with the circuit, each block in the block diagram having a block specification associated therewith;

generating a design file for each block in the block diagram using the associated block specification and one of a plurality of design file templates;

implementing each block in the block diagram by editing its corresponding design file;

simulating operation of each block in the block diagram;

compiling a compiled design for the circuit; and after compiling the compiled design, incorporating first changes into the compiled design in response to second changes in at least one design file through the use of software links maintained between the compiled design and the at least one design file;

wherein generating the block diagram and the design file for each block, implementing and simulating each block, compiling the compiled design, and incorporating the first changes into the compiled design are all done under software control.

2. The method of claim 1 wherein generating the block diagram comprises manipulating visual objects in a graphical user interface using a graphic editor.

3. The method of claim 1 wherein generating the design file comprises instantiating the associated block specification directly from the block diagram into the design file under software control.

4. The method of claim 1 wherein the plurality of design file templates comprises at least one graphic format and at least one text format.

5. The method of claim 4 wherein the at least one text format comprises Verilog.

6. The method of claim 4 wherein the at least one text format comprises VHDL.

7. The method of claim 1 wherein implementing each block comprises editing a graphic design file using a graphic editor.

8. The method of claim 1 wherein implementing each block comprises editing a text design file using a text editor.

9. The method of claim 1 wherein the block diagram comprises a plurality of blocks, the method further comprising combining selected ones of the plurality of blocks into a group of blocks; and simulating operation of the group of blocks.

10. The method of claim 9 wherein the block diagram is presented in a graphical user interface and combining selected ones of the plurality of blocks comprises enclosing a region of the block diagram including the selected ones of the plurality of blocks within a two-dimensional space in the graphical user interface.

11. The method of claim 9 wherein the block diagram is presented in a graphical user interface and combining selected ones of the plurality of blocks comprises individually selecting each of the selected ones of the plurality of blocks in the graphical user interface.

12. The method of claim 1 wherein simulating operation of each block comprises employing a functional simulation technique for each block corresponding to a format of the design file associated with the block.

13. The method of claim 1 wherein the circuit has system requirements associated therewith and compiling the compiled design comprises determining whether the compiled design conforms to the system requirements.

14. The method of claim 13 wherein determining whether the compiled design conforms to the system requirements comprises identifying a critical timing path.

15. The method of claim 13 wherein determining whether the compiled design conforms to the system requirements comprises performing a timing simulation.

16. The method of claim 1 wherein simulating operation of each block comprises generating a design netlist corresponding to the design file.

17. The method of claim 16 wherein compiling the compiled design comprises optimizing the design netlist thereby generating an optimized netlist.

18. The method of claim 17 wherein compiling the compiled design further comprises mapping the optimized netlist to a specific device type thereby generating a routed netlist.

19. The method of claim 18 wherein compiling the compiled design further comprises generating timing information from the routed netlist.

20. The method of claim 19 wherein generating timing information comprises identifying a critical timing path.

21. The method of claim 19 wherein generating timing information comprises performing a timing simulation on the routed netlist.

22. The method of claim 1 further comprising, under software control, configuring a device according to the compiled design.

23. At least one computer readable medium containing program instructions for designing a circuit, said at least one computer readable medium comprising:

computer readable code for generating a block diagram corresponding to the circuit according to an external specification associated with the circuit, each block in the block diagram having a block specification associated therewith;

computer readable code for generating a design file for each block in the block diagram using the associated block specification and one of a plurality of design file templates;

computer readable code for implementing each block in the block diagram by editing its corresponding design file;

computer readable code for simulating operation of each block in the block diagram; and computer readable code for compiling a compiled design for the circuit; and computer readable code for, after compiling the compiled design, incorporating first changes into the compiled design in response to second changes in at least one design file through the use of software links maintained between the compiled design and the at least one design file.

24. A circuit designed by a method comprising:

generating a block diagram corresponding to the circuit according to an external specification associated with the circuit, each block in the block diagram having a block specification associated therewith;

generating a design file for each block in the block diagram using the associated block specification and one of a plurality of design file templates;

implementing each block in the block diagram by editing its corresponding design file;

simulating operation of each block in the block diagram;

compiling a compiled design for the circuit; and after compiling the compiled design, incorporating first changes into the compiled design in response to second changes in at least one design file through the use of software links maintained between the compiled design and the at least one design file;

wherein generating the block diagram and the design file for each block, implementing and simulating each block, compiling the compiled design, and incorporating the first changes into the compiled design are all done under software control.

25. The at least one computer readable medium of claim 23 wherein the computer readable code for generating the block diagram enables a user to manipulate visual objects in a graphical user interface.

26. The at least one computer readable medium of claim 23 wherein the computer readable code for generating the design file comprises computer readable code for instantiating the associated block specification directly from the block diagram into the design file.

27. The at least one computer readable medium of claim 23 wherein the plurality of design file templates comprises at least one graphic format and at least one text format.

28. The at least one computer readable medium of claim 27 wherein the at least one text format comprises Verilog.

29. The at least one computer readable medium of claim 27 wherein the at least one text format comprises VHDL.

30. The at least one computer readable medium of claim 23 wherein the computer readable code for implementing each block enables a user to edit a graphic design file.

31. The at least one computer readable medium of claim 23 wherein the computer readable code for implementing each block enables a user to edit a text design file.

32. The at least one computer readable medium of claim 23 wherein the block diagram comprises a plurality of blocks, the at least one computer readable medium further comprising:

computer readable code for combining selected ones of the plurality of blocks into a group of blocks; and computer readable code for simulating operation of the group of blocks.

33. The at least one computer readable medium of claim 32 wherein the block diagram is presented in a graphical user interface and the computer readable code for combining selected ones of the plurality of blocks enables a user to select the selected ones of the plurality of blocks by enclosing a region of the block diagram within a two-dimensional space in the graphic user interface.

34. The at least one computer readable medium of claim 32 wherein the block diagram is presented in a graphical user interface and the computer readable code for combining selected ones of the plurality of blocks enables a user to individually select each of the selected ones of the plurality of blocks in the graphical user interface.

35. The at least one computer readable medium of claim 23 wherein the computer readable code for simulating operation of each block employs a functional simulation technique for each block corresponding to a format of the design file associated with the block.

36. The at least one computer readable medium of claim 23 wherein the circuit has system requirements associated therewith and the computer readable code for compiling the compiled design comprises computer readable code for determining whether the compiled design conforms to the system requirements.

37. The at least one computer readable medium of claim 36 wherein the computer readable code for determining whether the compiled design conforms to the system requirements comprises computer readable code for identifying a critical timing path.

38. The at least one computer readable medium of claim 36 wherein the computer readable code for determining whether the compiled design conforms to the system requirements comprises computer readable code for performing a timing simulation.

39. The at least one computer readable medium of claim 23 wherein the computer readable code for simulating operation each block comprises computer readable code for generating a design netlist corresponding to the design file.

40. The at least one computer readable medium of claim 39 wherein the computer readable code for compiling the compiled design comprises computer readable code for optimizing the design netlist thereby generating an optimized netlist.

41. The at least one computer readable medium of claim 40 wherein the computer readable code for compiling the compiled design further comprises computer readable code for mapping the optimized netlist to a specific device type thereby generating a routed netlist.

42. The at least one computer readable medium of claim 41 wherein the computer readable code for compiling the compiled design further comprises computer readable code for generating timing information from the routed netlist.

43. The at least one computer readable medium of claim 42 wherein the computer readable code for generating timing information comprises computer readable code for identifying a critical timing path.

44. The at least one computer readable medium of claim 42 wherein the computer readable code for generating timing information comprises computer readable code for performing a timing simulation on the routed netlist.

45. The at least one computer readable medium of claim 23 further comprising computer readable code for configuring a device according to the compiled design.

46. A computer system comprising:

a central processing unit;

a display;

a keyboard; and memory having program instructions for designing a circuit stored therein, the memory comprising:

computer readable code for generating a block diagram corresponding to the circuit according to an external specification associated with the circuit, each block in the block diagram having a block specification associated therewith;

computer readable code for generating a design file for each block in the block diagram using the associated block specification and one of a plurality of design file templates;

computer readable code for implementing each block in the block diagram by editing its corresponding design file;

computer readable code for simulating operation of each block in the block diagram; and computer readable code for compiling a compiled design for the circuit; and computer readable code for, after compiling the compiled design, incorporating first changes into the compiled design in response to second changes in at least one design file through the use of software links maintained between the compiled design and the at least one design file.

* * * * *